United States Patent [19]
Germanton

[11] Patent Number: 5,955,705
[45] Date of Patent: Sep. 21, 1999

[54] MODULAR WEIGHING SCALE

[75] Inventor: Damon Germanton, Kennalon, N.J.

[73] Assignee: Measurement Specialties, Inc., Fairfield, N.J.

[21] Appl. No.: 08/789,281

[22] Filed: Jan. 28, 1997

[51] Int. Cl.$^6$ .......................... G01G 21/00; G01G 21/22
[52] U.S. Cl. .......................... 177/126; 177/253; 177/262
[58] Field of Search .................................. 177/126, 127, 177/128, 129, 253, 262

[56] References Cited

U.S. PATENT DOCUMENTS

| 4,346,771 | 8/1982 | Persson et al. | 177/145 |
| 5,773,767 | 6/1998 | Collins, Jr. et al. | 177/126 |

*Primary Examiner*—Randy Gibson
*Attorney, Agent, or Firm*—Plevy & Associates

[57] ABSTRACT

A modular scale adapted to receive a rigid platform for supporting a weight has a frame having a base and a pair of legs extending from the base. The scale has a plurality of support assemblies adapted to be carried by the frame. Each support has at least one sensor wherein each sensor is adapted to provide a reference value and an output relative to a portion of the weight received. A display shows a numerical value corresponding to the composite sensor value. In a preferred embodiment the frame is generally "U"-shape. The frame defines a central open area between the legs, wherein legs from other modular scales can be placed in the central open area of the modular scale for shipping. Each of the legs has a foot projecting towards each other, and the support assemblies are carried by the feet and the base. The frame is made of a plastic and of a rib construction such that the frame is relatively light weight.

20 Claims, 8 Drawing Sheets

MODULAR WEIGHING SCALE

FIELD OF THE INVENTION

This invention relates generally to an electronic weighing scale, and more particularly to an electronic weighing scales that is modular allowing for easy assembly of components at a remote location and/or custom design.

BACKGROUND OF THE INVENTION

The weighing scale is an item commonly found in bathrooms, with the electronic weighing scale becoming more common. While the electronic scale has allowed for greater design variations, such as a transparent platform, such as disclosed in U.S. patent application Ser. No. 08/385,349, filed on Feb. 8, 1995, the typical scale is generally rectangular in shape and placed on the floor of the room.

In addition, it is generally recognized that the weighing scale is generally of a size greater than one foot by one foot, by an inch and half thick. While this is not large, the weighing scale cannot be shipped in a more compact space from the initially assembly to the end user. The scale, also, upon initial assembly fits a certain design scheme. If the scale does not fit in a new decorating scheme, the user/owner is forced to replace the scale with a new scale.

The entire weight of the weighing scale also is shipped from the initial assembly to the end users. An added consideration is that the majority of the cost of the scale, with the exclusion/exception of the marketing, is incurred at the initial assembly.

It is desired to have a scale which is modular allowing for easy final assembly at a location close to the end user and compactness of shipping prior to this point and allowing for customization. In addition, it is desired to have a scale wherein a portion of the cost can be deferred to closer to the sale to the end user and, likewise, reduce the portion of the weight of the scale that needs to be shipped until the final assembly.

SUMMARY OF THE INVENTION

This present invention is directed to a scale. A modular scale adapted to receive a rigid platform for supporting a weight has a frame having a base and a pair of legs extending from the base. The scale has a plurality of support assemblies adapted to be carried by the frame. Each support has at least one sensor wherein each sensor is adapted to provide a reference value and an output value relative to a portion of the weight received. A display shows a numerical value corresponding to the composite sensor value.

In a preferred embodiment the frame is generally "U"-shape. The frame defines a central open area between the legs, wherein legs from other modular scales can be placed in the central open area of the modular scale for shipping. Each of the legs has a foot projecting towards each other, and the support assemblies are carried by the feet and the base. The frame is made of a plastic and of a rib construction such that the frame is relatively light. A combining junction combines each of the sensor output values to obtain a value representative of the total weight applied to the platform. A display shows a numerical value corresponding to the composite sensor value.

One object, feature, and advantage resides in a scale that is adapted to receive the rigid platform at a second location, such that the rigid platform is not integral with the frame.

Another object, feature, and advantage resides in the legs of the frame adapted to flex relative to the base for installation of the rigid platform.

Further objects, features, and advantages of the present invention will become more apparent to those skilled in the art as the nature of the invention is better understood from the accompanying drawings and detailed descriptions.

BRIEF DESCRIPTION OF THE DRAWINGS

For the purpose of illustrating the invention, there is shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
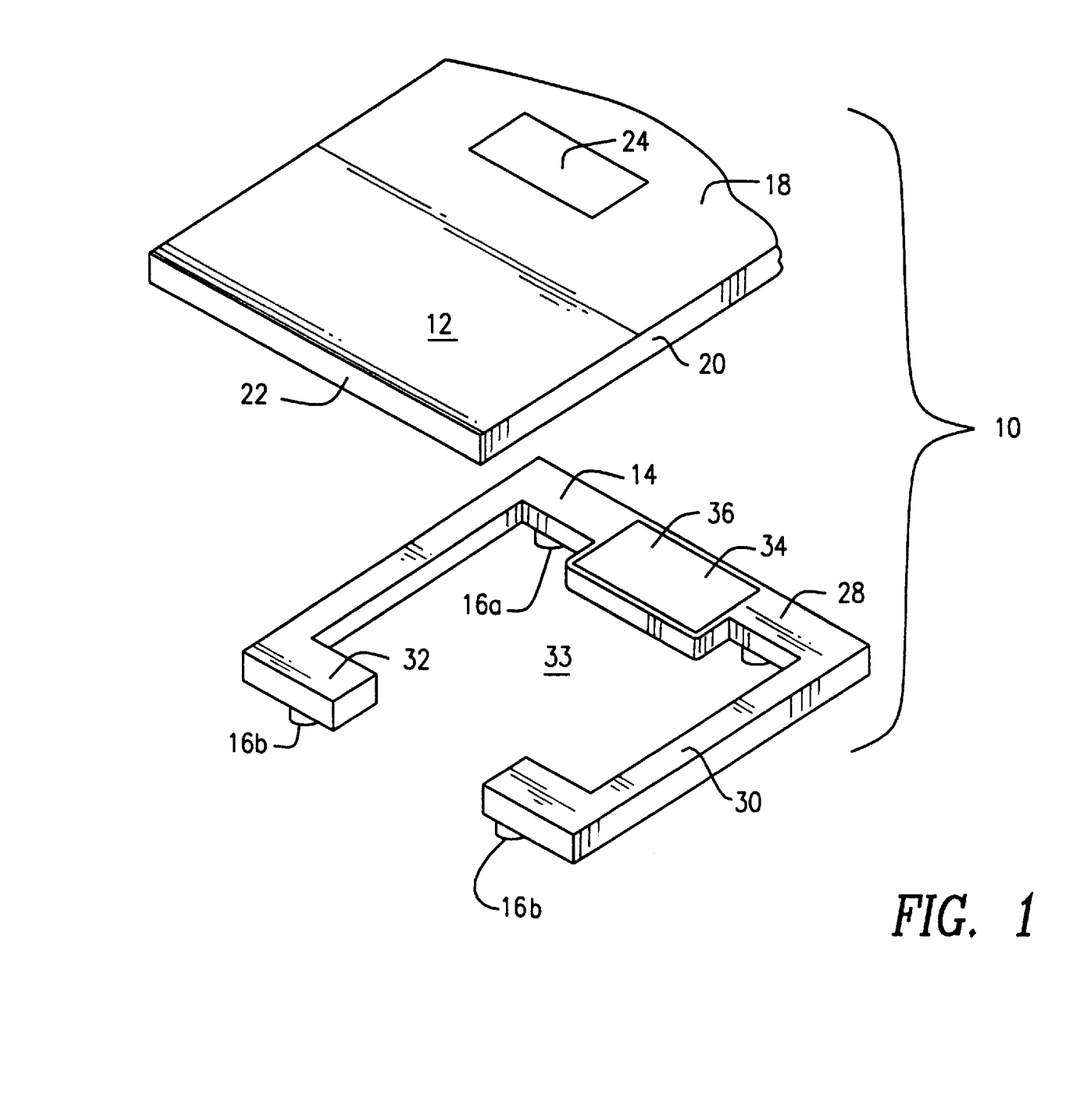
FIG. 1 is an exploded perspective view of a preferred embodiment of a weighing scale of the present invention.

Referring now to the drawings, wherein like numerals indicate like elements and where prime (') indicates counterparts of such like elements, there is illustrated in FIG. 1 a perspective view of a weighing scale which has been identified by the numeral 10.

Referring to FIG. 1, the weighing scale 10 has a rigid platform 12, a frame 14, and a plurality of support assemblies 16a and 16b. The rigid platform 12 which acts as a cover for the frame 14 has a weight receiving top 18 and a plurality of downward depending sides 20 and 22. The weight receiving top 18 of the rigid platform 12 has an opening 24.

The frame 14 is generally "U"-shaped and has a base 28 and a pair of legs 30. The legs 30 each project from an end of the base 28. A foot 32 of the leg 30 is located at the distal end of each of the legs 30. The feet 32 project from the legs 30 towards each other. The frame 14 defines a central open area 33 between the feet 32 and the base 28. The scale has a display assembly 34 located on the base 28 of the frame 14. The display assembly 34 has a display 36 for providing a numerical indication of the weight applied to the rigid platform 12 as explained below. The display 36 is preferably a light emitting diode display or a liquid crystal display.

The support assemblies 16 are mounted to the frame 14 generally at the four corners of the "U"-shaped frame 14. In a preferred embodiment, a pair of support assemblies 16a are mounted to the base and a pair of support assemblies 16b are mounted to the feet 32 of the legs 30.

Figure 2:
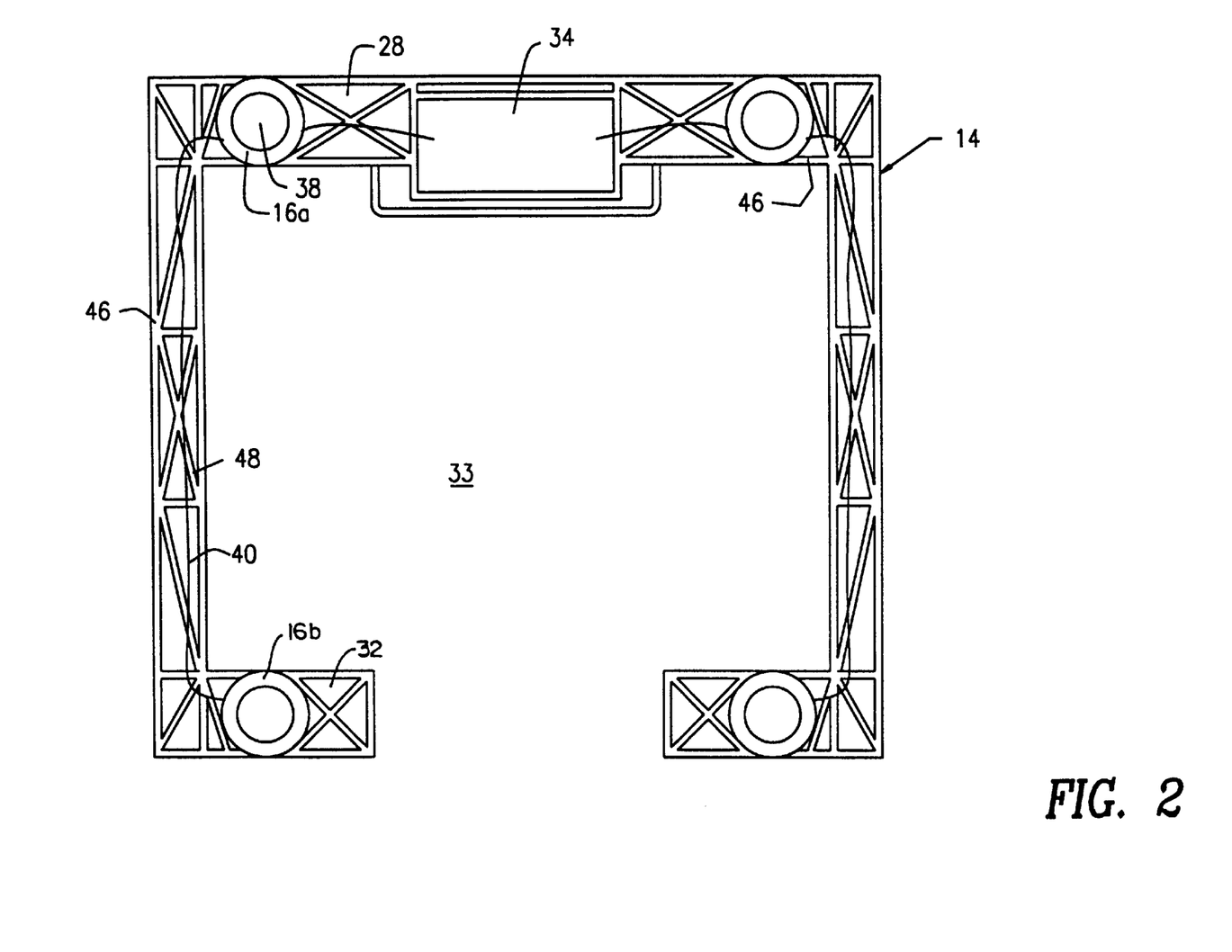
FIG. 2 is a bottom view of the of the scale.

A bottom view of the frame 14 is shown in FIG. 2. The support assemblies 16a and 16b are mounted to the base 28 and the feet 32 of the frame 14, respectively. Each of the support assemblies 16 has a footpad 38 for engaging the ground. A conductor wire 40 extends from sensors located in the support assemblies 16a and 16b to the display assembly 34.

In a preferred embodiment, the frame 14 is formed with a top 44, a seen in FIG. 1, and a perimeter wall 46. The frame 14 has a series of ribs 48 that extend from the underside of the top 44 and between the perimeter wall 46 and themselves for stiffening the frame 14. In a preferred embodiment, the frame 14 is made of a plastic and is molded.

The support assemblies 16 project downward from the frame 14. The support assemblies 16b projecting from the feet 32 of the legs 30 can be seen in FIG. 3. The footpads 38 of the support assemblies 16 are adapted for engaging the ground. The perimeter wall 46 and the ribs 48 are seen extending downward from underneath the top 44 of the frame 14.

Figure 3:
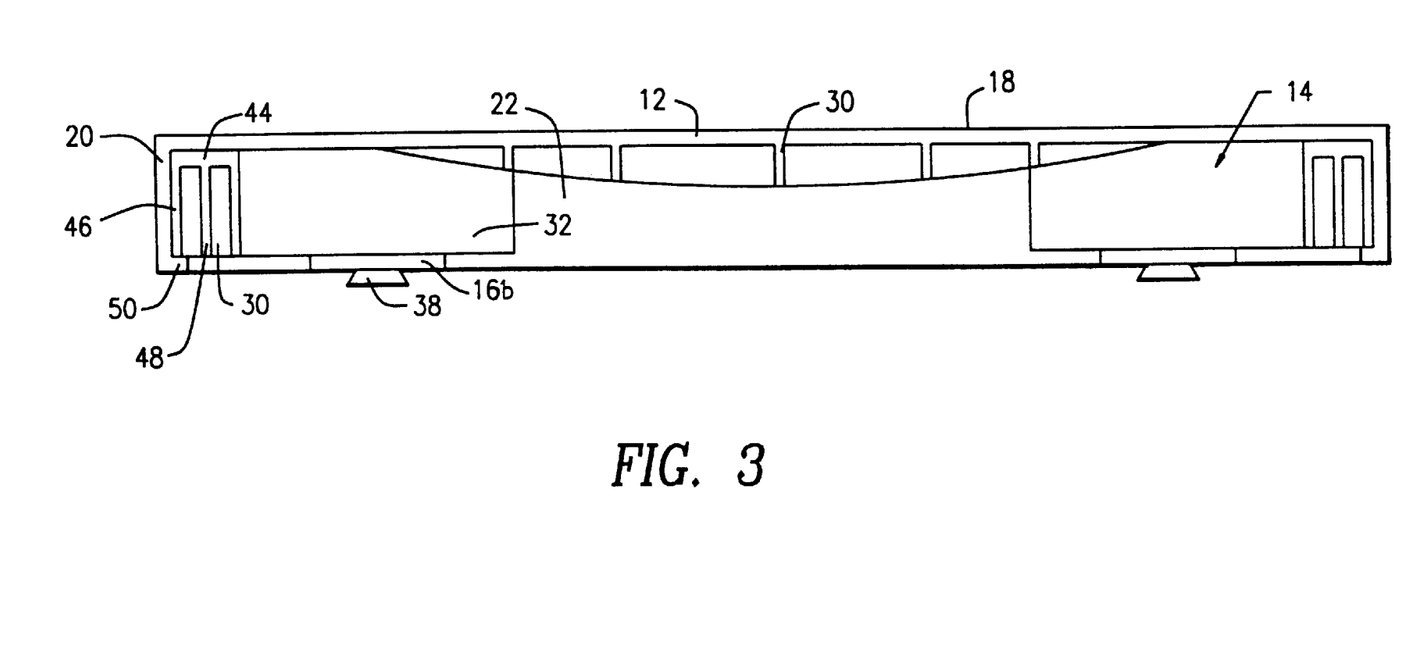
FIG. 3 is a sectional view of the scale including a rigid platform taken along the line 3—3 of FIG. 2.

The rigid platform 12 covers the frame 14. The weight-receiving top 18 of the rigid platform 12 lies on top of the top 44 of the frame 14. The sides 20 and 22 of the rigid platform 12 encircle the outside perimeter wall 46 of the frame 14. The sides 20 each have a locking tab 50 which projects under a respective leg 30 of the frame 14 to retain the rigid platform 12 on the frame 14. The underneath of the weight-receiving top 18 has a plurality of ribs 52 projecting downward for stiffening the rigid platform 12.

Figure 4A:
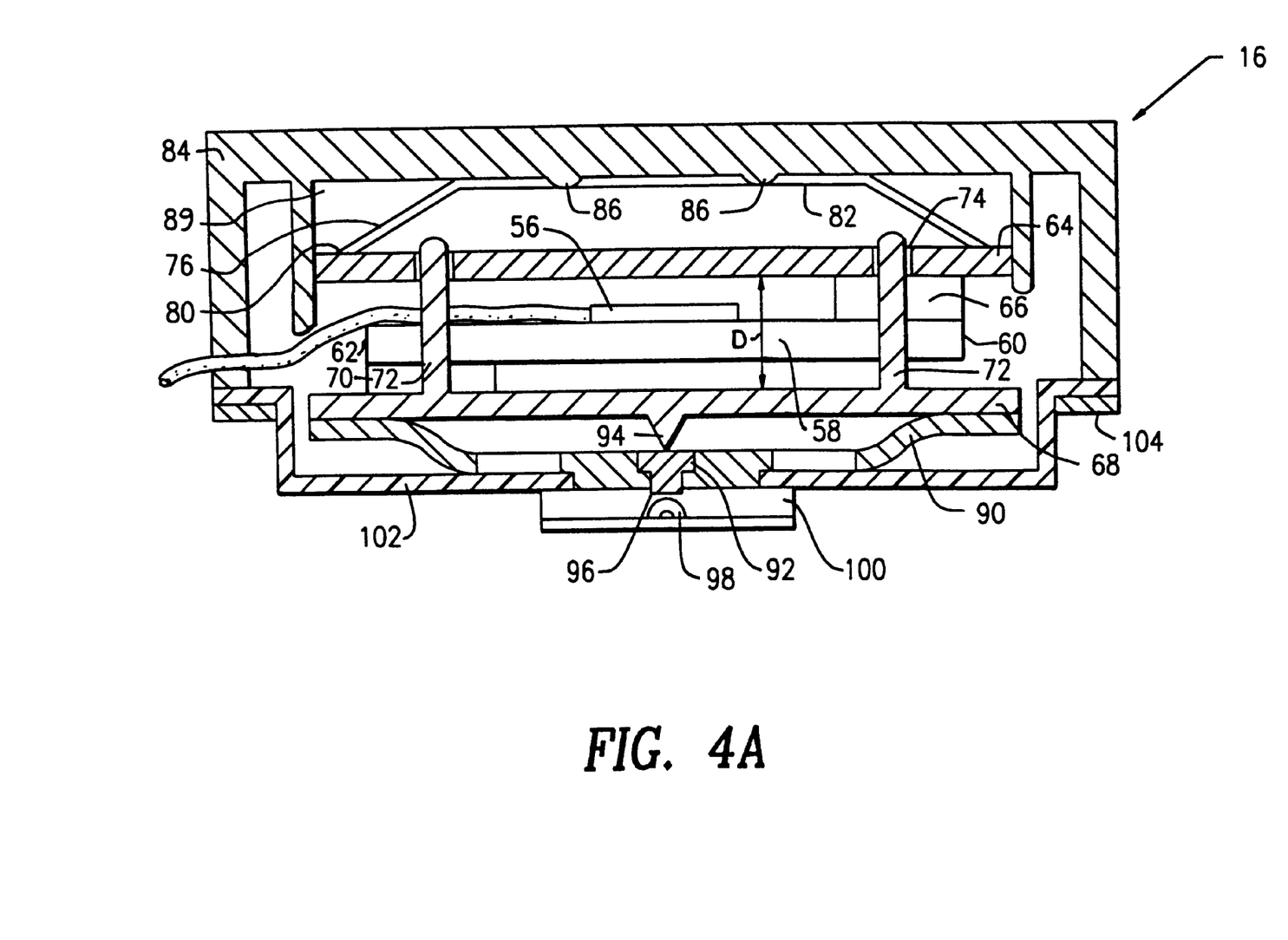
FIG. 4A is a cross-sectional view of a support assembly.
Figure 4B:
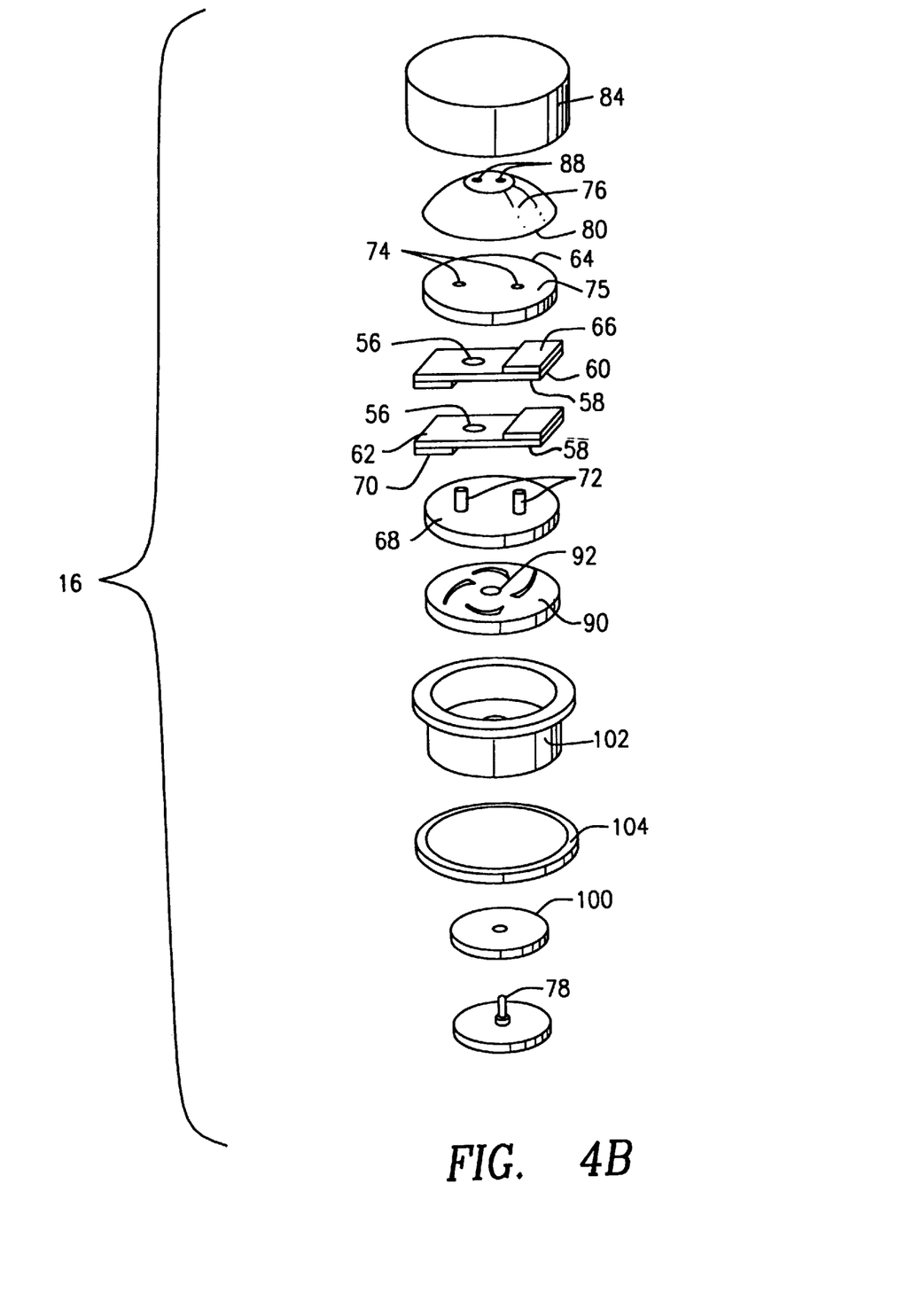
FIG. 4B is an exploded view of a support assembly shown in cross-section in FIG. 4A.

Referring to FIGS. 4A and 4B, each of the support assemblies 16 has a pair of sensors 56 mounted within each in a preferred embodiment. The sensors 56 are each mounted to a pair of center metal strips 58. The metal strips 58 have a spring constant value that enables the metal strips 58 to elastically deflect under the force of a weight applied to the support assembly 16. Each of metal strips 58 has a first end 60 and a second end 62. The first end 60 of each metal strip 58 is joined to an upper plate 64, wherein a first spacer 66 is juxtaposed between the upper plate 64 and the first end 60. The second end 62 of each metal strip 58 is joined to a lower plate 68, wherein a second spacer 70 is juxtaposed between the lower plate 68 and the second end 62. Since opposite ends of the metal strips 58 are joined to different plates, it will be understood that as the upper plate 64 and lower plate 68 are biased toward one another, the metal strips 58 are caused to bend in the area of the sensors 56. Two posts 72 extend upwardly from the lower plate 68. The two posts 72 extend upwardly through apertures 74 in the upper plate 64. The presence of the posts 72 from the lower plate 68 prevents the upper plate 64 and lower plate 68 from moving laterally with respect to one another.

A frustrum-shaped spring element 76 rests upon a top surface 78 of the upper plate 64. The spring element 76 has a wide bottom rim 80 that engages the upper plate 64 at points near its periphery. The apex surface 82 of the spring element 76 is smaller than its bottom rim and engages a primary housing 84 of the support assembly 16. Projections 86 extend from the primary housing 84 and engage apertures 88 in the spring element 76, thereby retaining the spring element 76 in place. The primary housing 84 defines a recessed area 89 into which the spring element 76 and upper plate 64 pass.

It will be understood that as a person steps onto the platform 12, the weight of the person experienced by the support assembly 16 is transferred to the primary housing 84. The primary housing 84 does not rest upon the ground. As such, the weight is transferred to the upper plate 64 via the spring element 76. The upper plate 64, in turn, transfers the weight to the first end 60 of each of the metal strips 58 on which the piezoresistive sensors 56 are placed. The second end 62 of each of the metal strips 58 is coupled to the lower plate 68.

A plastic spring element 90 is coupled to the bottom of the lower plate 68. A flat metal element 92 is disposed in the center of the plastic element 90. A pointed projection 94 extends downwardly from the center of the lower plate 68. The plastic spring element 90 retains the flat element 92 directly below the pointed projection 94 wherein the plastic spring element 90 biases the flat metal element 92 against the pointed projection 94. A threaded aperture 96 is disposed in the bottom of the flat metal element 92 opposite the pointed projection 94. A screw 98 joins a footpad 100 to the plastic spring element 90. The footpad 100 rests upon the ground. As a result, when weight is applied to the footpad 100, the flat metal element 92 is pressed against the pointed projection 94. The pointed projection 94, being part of the lower plate 68, biases the lower plate 68 toward the upper plate 64. The lower plate 68, in turn, transfers the force of the second end 62 of each of the metal strips 58 upon which the piezoresistive sensors 56 are disposed.

As weight is applied to the platform 12, the upper and lower plates 64, 68 are biased toward each other. This bias bends the metal strips 58 and reduces the distance D in between the upper and lower plates 64, 68. An elastomeric boot 102 covers the open bottom of the primary housing 84. The boot 102 allows the upper and lower plates 64, 68 to compress toward one another while protecting the metal strips 58 and the piezoresistive sensors 56 from corrosion. The boot 102 is held in place by a locking ring 104 that is mechanically attached to the primary housing 84. U.S. patent application Ser. No. 08/385,349, filed on Feb. 8, 1995, describes a weighing scale with piezoresistive sensors, and is incorporated by reference. U.S. patent application Ser. No. 08/641,624 which was filed on May 2, 1996 and titled "Load Cell for an Electrical Weighing Scale" is also incorporated by reference.

Figure 5:
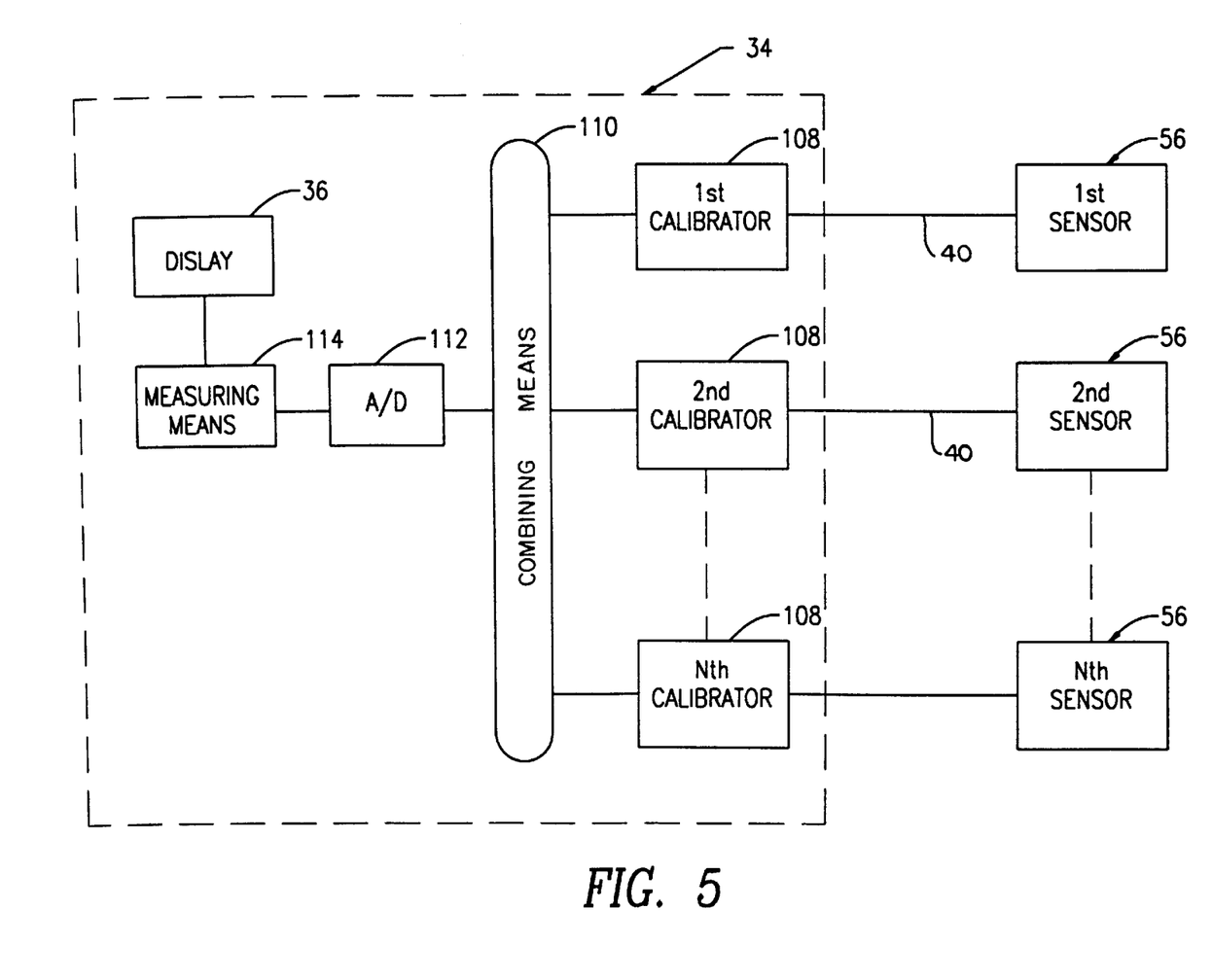
FIG. 5 is a block diagram representative of circuitry contained within the weighing scale.

Referring to FIG. 5, there is shown a block diagram of the electrical circuitry for a preferred embodiment of the present invention weighing scale. In each of the support assemblies 16, as seen in FIG. 2, is disposed at least one sensor 56. Each of the sensors 56 is an electrical device that varies in resistance in response to a weight applied to the various supports. Weight is applied to the various supports via the platform 12, as seen in FIG. 3. In a preferred embodiment, each sensor 56 comprises a plurality of semiconductor strain gauges or other piezoresistive elements. The sensors 56 are coupled in parallel such that virtually any number of sensors 56 may be used in the electronic weighing scale. The parallel arrangement of the sensors 56 enables any number of sensors to be used within the scale with only a single combiner.

The display assembly 34 contains the various electronics needed to convert the sensor signals into a numerical display indicative of weight. The display assembly 34 includes a plurality of calibrating circuits 108, a combining junction 110, an analog-to-digital converter (A/D) 112, a measuring means 114, and the display 36. The calibrating circuits 108 individually calibrate corresponding sensors 56 providing span matching, impedance normalization, and optionally offset compensation, as will later be explained. Each sensor 50 is coupled to a corresponding calibrating circuit 108 via conductors 40. The calibrating circuits 108 enable the sensors 56 to provide a response that reflects an accurate proportional share of the total weight applied to the platform regardless of ambient changes in temperature. The calibrating circuits 108 are associated respectively with corresponding ones of the sensors 56 such that the electrical parameters of each sensor 56 may be adjusted individually. In a preferred embodiment, the calibrators 12 are entirely passive devices.

The plurality of calibrating circuits 108 further allows the sensors 56 to be compensated for variances in the length, or resistance, of conductors 38, and variances in the mounting arrangements of individual sensors 56. For example, variances in the mounting arrangements that stress a particular sensor 56 may necessitate the addition of a calibrating resistance to that particular sensor 56 to obtain appropriate indications of an applied weight.

The combining junction 110 couples the various sensors 56 in parallel to the measuring means 114, via the analog-to-digital converter 112. The measuring means 114 includes the display drivers needed for the display 36. The display 36 displays characters or numerals which are large enough to be viewed by a typical user standing on the platform 12. The combining junction 110 couples the sensors 56 in parallel and provides a composite signal to the measuring means 114. If a biasing potential, such as a direct current reference source, is applied to the sensors 56, then each sensor 56 produces a corresponding sensor signal in response to a weight applied to the platform. The magnitude of the corresponding sensor signal is proportional to the weight applied to a particular sensor 50. The combining junction 110 combines the sensor signals to obtain an aggregate or composite sensor signal. The magnitude of the composite sensor signal is proportional to the applied weight on the entire platform 12.

The measuring means 114 is coupled to the combining junction 110 and provides a user with a numerical value indicative of the applied force or weight. The measuring means 114 includes the needed display drivers and may be combined with the analog-to digital (A/D) converter 112 as a single integrated circuit. The analog input of the A/D converter 112 is coupled to the combining junction 110 and the digital output of the A/D converter 112 is coupled to the measuring means 114. The measuring means 114 provides appropriate current and voltage levels to illuminate the display 36. The display 36 is preferably a light emitting diode display, or a liquid crystal display. In other embodiments, the measuring means 114 may comprise active devices such as amplifiers, or operational amplifiers. The amplifiers would be coupled to a display comprising an analog gauge for measuring voltage or current.

Referring to FIG. 1, the frame 14 with the assemblies can be manufactured at one location and assembled with the rigid platform 12 at a second location. The "U"-shape of the frame 14 with the central open area 33 allows the frame 14 to be shipped in a more compact state prior to attachment of the rigid platform. The legs from other modular scales can be placed in the central open area of the frame 14 for allowing compact shipping. In addition, in that the frame 14 is made of a plastic and of a rib construction, the frame is relatively light weight.

Upon delivery to the final assembly location, the legs 30 of the frame 14 can be flexed slightly inwardly to allow for the legs 30 to pass by the locking tabs 50 of the sides 20 of the rigid platform 12. The locking tabs 50 assist in securing the frame 14 within the rigid platform 12. It is also recognized that an adhesive means 118, as seen in FIG. 3, such as a epoxy, glue, or double stick tape, can be used to secure the rigid platform 12 to the frame 14. The final assembly of the rigid platform 12 to the frame 14 can be done at the point of sale or by an interior designer. The battery can be installed in the display assembly 34 at this time.

Figure 6:
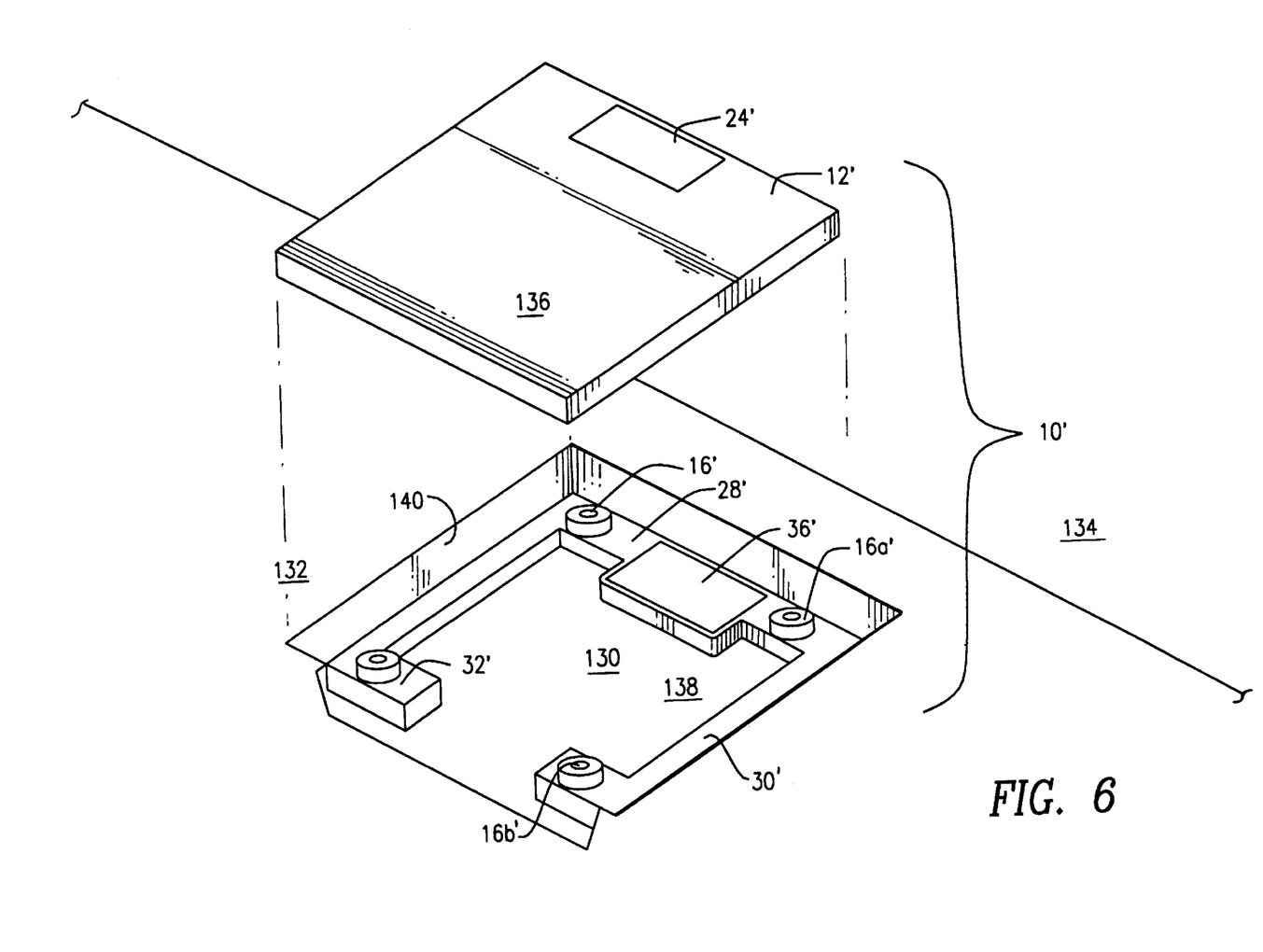
FIG. 6 is a perspective view of an alternative embodiment of the weighing scale with portions broken away.

Referring to FIG. 6, an alternative embodiment of a weight scale 10' is shown. The scale 10' has a rigid platform 12', a frame 14, and a plurality of support assemblies 16'. The frame 14' is adapted to be received in a hole 130 formed in a floor 132 of a room 134, such that a top 136 of the rigid platform 12' is flush with the floor 132. The hole 130 has a footing 138 and a plurality of walls 140. The rigid platform 12' which acts as a cover for the frame 14 has the weight receiving top 136 with an opening 24'.

The frame 14' is generally "U"-shaped and has a base 28' and a pair of legs 30'. The legs 30' each project from an end of the base 28'. A foot 32' of the leg 30' is located at the distal end of each of the legs 30'. The feet 32' project from the legs 30' towards each other. The scale has a display assembly 34' located on the base 28' of the frame 14'. The display assembly 34' has a display 36' for providing a numerical indication of the weight applied to the rigid platform 12'.

The support assemblies 16' are mounted to frame 14' generally at the four corners of the "U"-shaped frame 14'. In a preferred embodiment, a pair of support assemblies 16a' are mounted to the base and a pair of support assemblies 16b' are mounted to the feet 32' of the legs 30'. In contrast to the previous embodiment, the support assemblies 16' project upward from the frame 14' and are interposed between the frame 14' and the rigid platform 12'. Each support assembly 16' has a foot 100' which projects upward.

Figure 7:
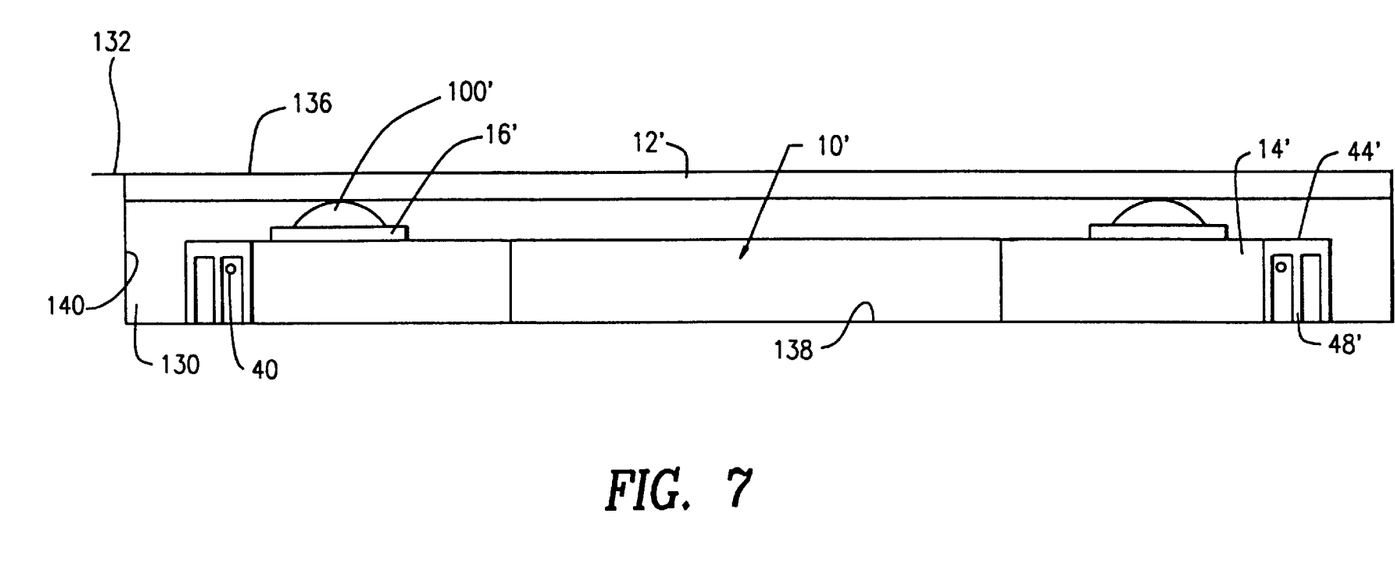
FIG. 7 is a sectional view of the scale taken along the line 7—7 of FIG. 6.

A sectional view of the scale 10' in the hole 130 in the floor 132 is shown in FIG. 7. The frame 14' rests upon the footing 138 of the hole or opening 130. The support assemblies 16' project upward from the frame 14'. The foot 100' of each support assembly 16' receives the underneath of the rigid platform 12'. The hole 130 is of such a depth that the top 136 of the rigid platform 12' is flush with the floor 132 of the room 134.

A conductor wire 40' extends from sensors located in the support assemblies to the display assembly 34.

In a preferred embodiment, the frame 14' is formed with a top 44' and a perimeter wall 46'. The frame 14' has a series of ribs 48' that extend from the underside of the top 44' and between the perimeter wall 46' and themselves for stiffening the frame 14'. In a preferred embodiment, the frame 14' is made of a plastic and is molded.

It is recognized that the frame 14' could be formed with the top 44' actually being a bottom and the series of ribs and the perimeter wall extend upward from the bottom. This would be more similar to the first embodiment, with the footpads 100 replaced with feet 100' and the display assembly 34' flipped so that the display 36' is on the ribbed side of the frame 14'.

It is recognized that the rigid platform 12 can be switched to fit the decor.

The present invention may be embodied in other specific forms without departing from the spirit or essential attributes therefore and, accordingly, references should be made to appended claims, rather than to the foregoing specification, as indicating the scope of the invention.

We/I claim:

1. A modular scale adapted to receive a rigid platform for supporting a weight, the scale comprising:

a frame having a base and a pair of legs extending from the base, each of said legs having a foot projecting toward each other, said frame defining a central open area between said legs;

a plurality of support assemblies, wherein at least two support assemblies are adapted to be carried by the feet and the base of said frame;

each support having at least one sensor, the sensor adapted to provide a reference value and an output value relative to a portion of the weight received; and, display means for displaying a numerical value corresponding to the composite sensor value;

wherein, each of said legs are adapted to be flexed towards one another to facilitate insertion of said frame in a scale enclosure.

2. A scale adapted to receive a rigid platform for supporting a weight according to claim 1, wherein the frame is made of a plastic and of a rib construction such that the frame is relatively light weight.

3. A scale adapted to receive a rigid platform for supporting a weight according to claim 2, wherein the support assemblies project upward from the frame and are adapted to engage the rigid platform.

4. A scale adapted to receive a rigid platform for supporting a weight, the scale comprising:
   a frame having a base and a pair of legs extending from the base, each of said legs having a foot projecting toward each other and being flexible toward each other, said frame defining a central open area between said legs;
   a plurality of support assemblies, wherein at least two support assemblies are adapted to be carried by the feet and the base of said frame;
   each support having at least one sensor, the sensor adapted to provide a reference value and an output relative to a portion of the weight received by the rigid platform;
   combining means for combining each of the sensor output values to obtain a value representative of the total weight applied to the platform; and
   display means for displaying a numerical value corresponding to the composite sensor value.

5. A scale adapted to receive a rigid platform for supporting a weight according to claim 2, wherein at least one sensor is disposed within each of the support assemblies, each sensor providing a reference value and a sensor output value, wherein the sensor output value corresponds to the portion of the weight supported by each of the support assemblies.

6. A scale adapted to receive a rigid platform for supporting a weight according to claim 2, wherein the support assemblies project downward from the frame and are adapted to be carried by the floor.

7. A scale adapted to receive a rigid platform for supporting a weight according to claim 5, wherein the platform is mounted directly to the frame.

8. A scale adapted to receive a rigid platform for supporting a weight according to claim 2, wherein the support assemblies project upward from the frame and are adapted to engage the rigid platform.

9. A scale comprising;
   a rigid platform for supporting a weight;
   a frame having a generally "U"-shape with a base and a pair of legs extending from the base each respectively adapted to be sufficiently flexed towards one another to enable said frame to be inserted into said rigid platform;
   a plurality of support assemblies carried by the frame, the support assemblies projecting downward from the frame;
   each support having at least one sensor, each sensor providing a reference value and a sensor output value, wherein the sensor output value corresponds to the portion of the weight supported by each of the support assemblies;
   combining means for combining each of the sensor output values in parallel to obtain a composite sensor value representative of the total weight applied to the platform; and
   display means for displaying a numerical value corresponding to the composite sensor value.

10. A scale according to claim 9, wherein the platform is mounted directly to the frame.

11. A scale according to claim 9, wherein the platform has a weight-receiving top and a plurality of sides depending from the top surface for enveloping the frame.

12. A scale according to claim 11, further comprising an adhesive means for securing the platform to the frame.

13. A scale according to claim 9, wherein the legs of the frame are adapted for flexing relative to the base of the frame.

14. A scale according to claim 13, wherein the platform has a weight-receiving top, a plurality of sides depending from the top for encircling the frame, and a plurality of locking tabs projecting from at least two sides underneath the frame.

15. A scale comprising:
    a rigid platform for supporting a weight;
    a frame having a generally "U" shape with a base and a pair of legs extending from the base, each of said pair of legs respectively adapted to be flexed inwardly to enable said frame to be inserted into said rigid platform;
    a plurality of support assemblies carried by the frame, the support assemblies projecting upward from the frame, and adapted to receive the rigid platform;
    each support having at least one sensor, each sensor providing a reference value and a sensor output value, wherein the sensor output value corresponds to the portion of the weight supported by each of the support assemblies;
    combining means for combining each of the sensor output values in parallel to obtain a composite sensor value representative of the total weight applied to the platform; and
    display means for displaying a numerical value corresponding to the composite sensor value.

16. A weighing scale system adapted for an opening in a floor, the scale comprising:
    a frame having a generally "U" shape with a base and a pair of legs each of said pair of legs respectively adapted to be flexed towards one another and extending from the base, the frame being adapted to be placed in the opening in the floor;
    a plurality of support assemblies carried by the frame, the support assemblies projecting upward from the frame;
    a rigid platform for supporting a weight carried by the plurality of support assemblies and adapted to be flush with the floor;
    each support having at least one sensor, each sensor providing a reference value and a sensor output value, wherein the sensor output value corresponds to the portion of the weight supported by each of the support assemblies;
    combining means for combining each of the sensor output values in parallel to obtain a composite sensor value representative of the total weight applied to the platform; and
    display means for displaying a numerical value corresponding to the composite sensor value.

17. A method of manufacturing a scale, comprising the steps of:

providing a frame having a generally "U"-shape with a base and a pair of legs each respectively adapted to be deflectable towards one another, and extending from the base;

mounting a plurality of support assemblies to the frame, wherein each support assembly has at least one sensor;

mounting a display assembly to the frame and having a combining means and a display means;

connecting a conductor wire between the sensors and the combining means; and securing a rigid platform to the frame.

18. A method of manufacturing a scale as in claim 17, further comprising the step of shipping the frame with the support assemblies to a second location prior to securing the rigid platform.

19. The scale of claim 1, wherein legs from other modular scales can be placed in said central open area for shipping.

20. The method of claim 16, wherein said step of securing said rigid platform to said frame comprises the step of flexing at least one leg of said pair of legs towards another leg of said pair of legs.

* * * * *